Dec. 29, 1942.   A. C. WILCOX   2,306,921
ELECTRIC KITCHEN UTENSIL
Filed Nov. 25, 1939   3 Sheets-Sheet 1

Inventor
Albert C. Wilcox
By Frease and Bishop
Attorneys

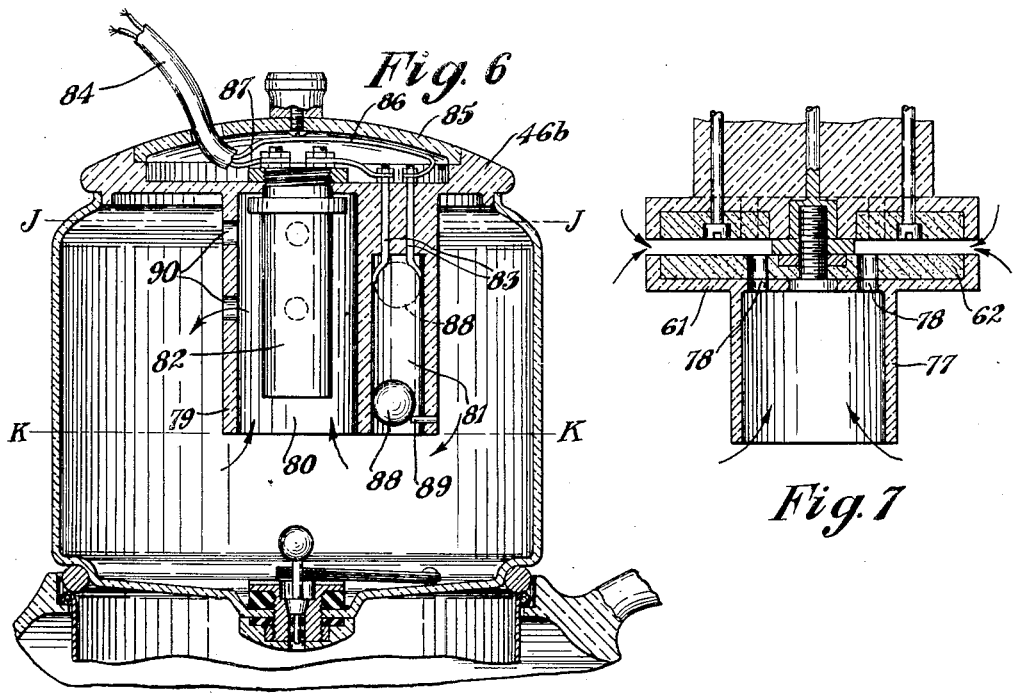
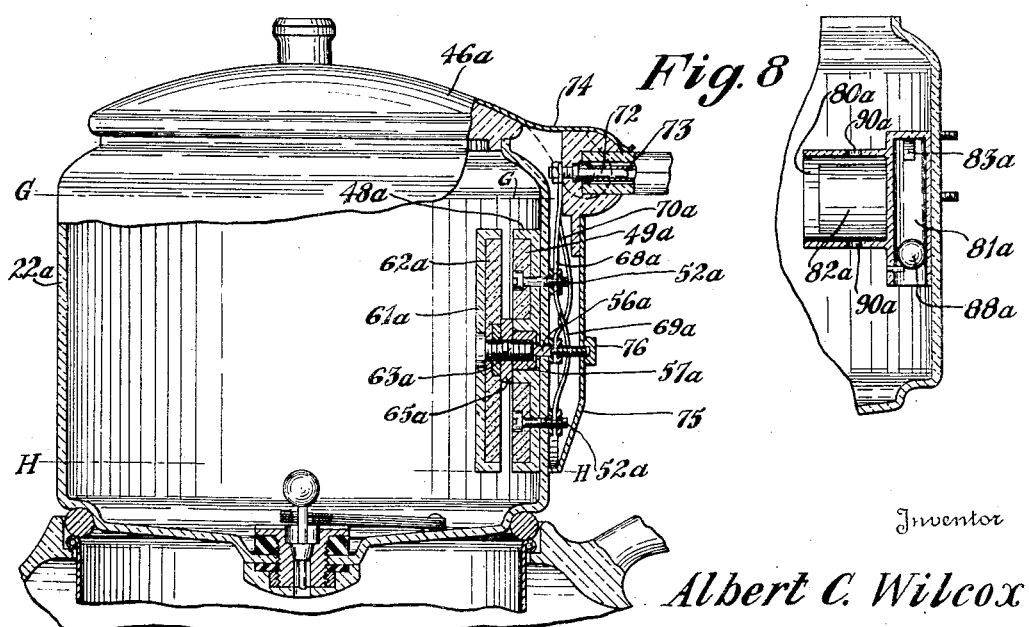

Dec. 29, 1942.   A. C. WILCOX   2,306,921
ELECTRIC KITCHEN UTENSIL
Filed Nov. 25, 1939   3 Sheets-Sheet 3

Inventor
Albert C. Wilcox
By Fraser and Bishop
Attorneys

Patented Dec. 29, 1942

2,306,921

UNITED STATES PATENT OFFICE 2,306,921

ELECTRIC KITCHEN UTENSIL

Albert C. Wilcox, East Liverpool, Ohio

Application November 25, 1939, Serial No. 306,115

6 Claims. (Cl. 219—40)

The invention relates to electrically operated kitchen utensils and more particularly to electric water heating means therein, so constructed that the electric circuit to the heating means is automatically closed by the placing of a certain amount of water in the utensil and automatically opened when the water drops below a predetermined level.

An object of the invention is to provide a utensil of the character referred to provided with a thermally controlled valve which is closed at normal room temperature and which automatically opens when the water reaches a desired temperature.

Another object is to provide an electric utensil equipped with an open contact heating element comprising certain improvements upon my prior Patents No. 2,143,046, granted January 10, 1939, and No. 2,152,122, granted March 28, 1939.

Figures 1, 2, 3, 4:
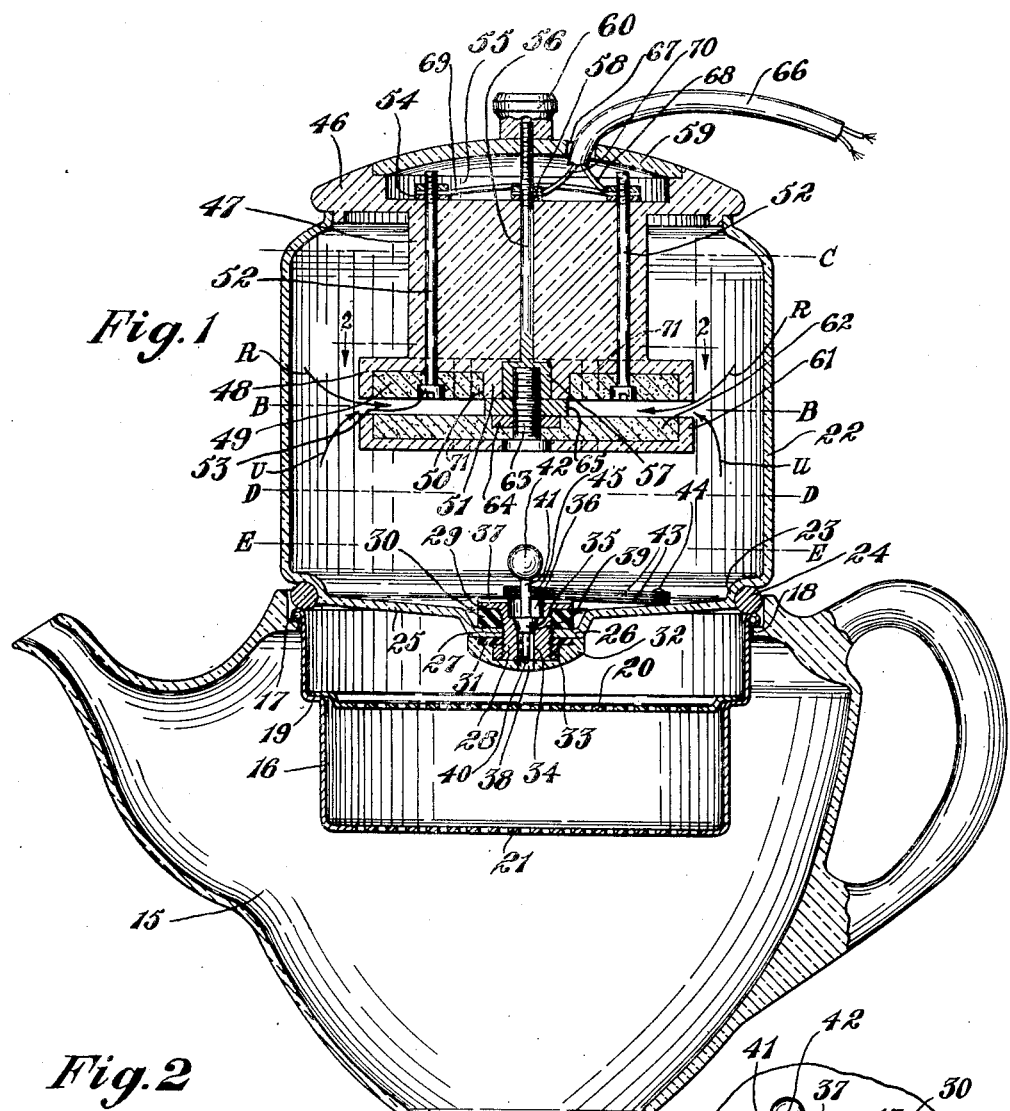
Figure 9:
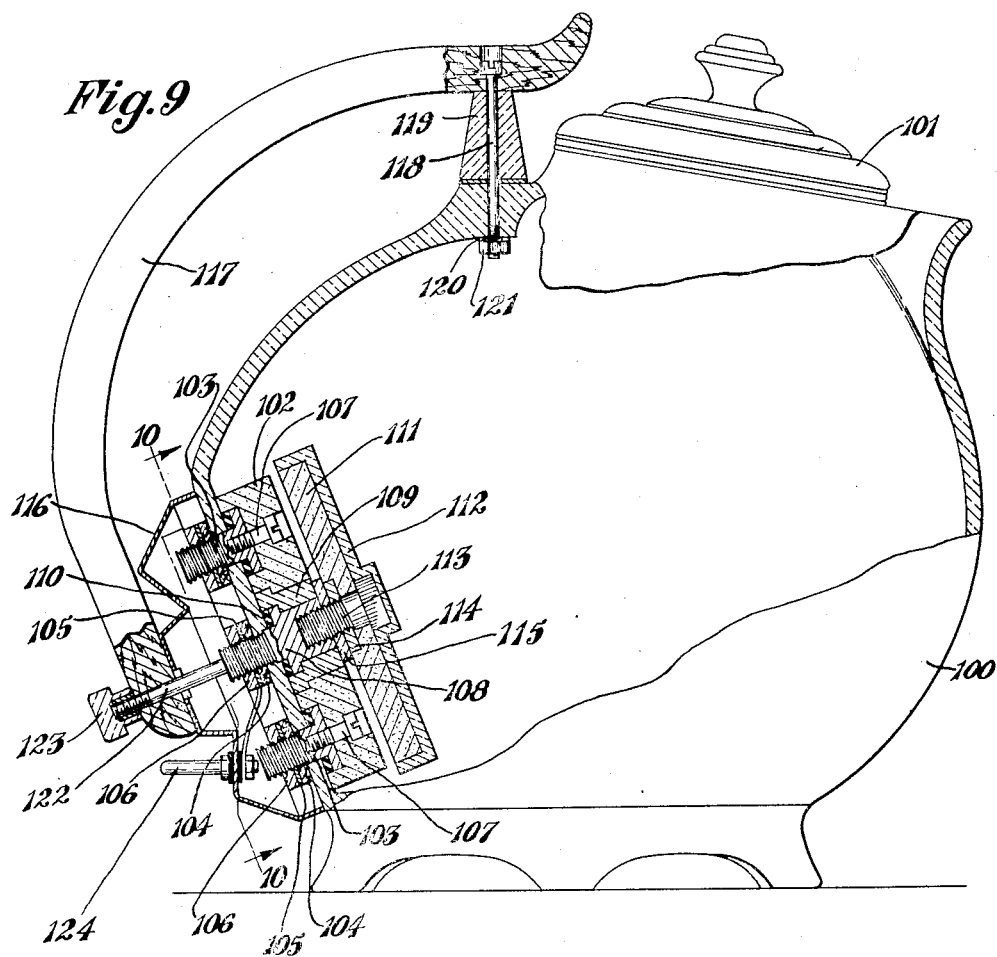
Figure 10:
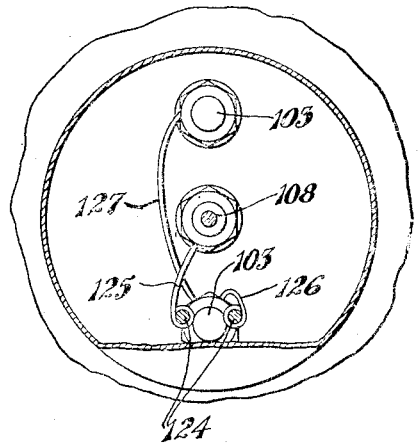

The above objects together with others which will be apparent from the drawings and following description, or which may be later referred to, may be attained by constructing the improved electric utensil in the manner illustrated in the accompanying drawings in which Figure 1 is a vertical sectional view through a drip coffee maker embodying the invention;

Fig. 2, a transverse sectional view through the heating element taken as on the line 2—2, Fig. 1;

Fig. 3, a fragmentary sectional view of the lower portion of the water container showing the thermally operated valve in open position;

Fig. 4, a top plan view of the stud in which the valve seat is located;

Fig. 5, a vertical sectional view of the upper portion of an electric drip coffee maker of the type shown in Figure 1 with the spaced electrodes of the heating element located in vertical position and attached to a side wall of the water container;

Fig. 6, a vertical sectional view of the upper portion of a drip coffee maker provided with a conventional heating element in place of the open electrode type shown in Figs. 1 and 5;

Fig. 7, a fragmentary sectional view of an open electrode type of heating element such as shown in Figure 1 provided with a water circulating tube;

Fig. 8, a fragmentary sectional view of a portion of one side of the water container showing the conventional type heating element located in horizontal position and connected to one side wall of the water container;

Fig. 9, a vertical sectional view of a teakettle provided with the improved open electrode type of heating element located in upright position; and Fig. 10, a fragmentary section taken as on the line 10—10, Fig. 9.

Similar numerals refer to similar parts throughout the several views.

Referring first to the construction of electric drip coffee maker, illustrated in Figs. 1 to 4, inclusive, a pot or receptacle for the coffee beverage is indicated at 15 and may be of any suitable and desired material, preferably china-ware or pottery as illustrated.

The ground coffee basket indicated generally at 16 may be of aluminum or other sheet metal, and is provided at its upper end with a peripheral bead 17 adapted to rest upon the inturned flange 18 at the upper open end of the pot or beverage receptacle 15.

At a point spaced above the bottom the coffee basket is provided with a shoulder 19 upon which a perforated spreader plate 20 is arranged to seat.

The bottom wall 21 of the coffee basket is also perforated as in usual practice.

The water container 22 is preferably formed of glass, although any other insulation material may be used, and has the reduced shouldered portion 23 at its lower end forming a slightly concaved groove into which the gasket 24 is received. This gasket is slightly smaller in diameter than the shoulder 23 so that it may be stretched and snapped into position in the groove to act as a cushion between the water container and the pot.

The bottom wall 25 of the water container is inclined downward and toward the center and terminates in the central recessed portion 26 having a central opening 27 through which is located a threaded stud 28 formed of any suitable metal and having an annular flange 29 at its upper end which fits tightly upon the rubber gasket 30 located within the recessed portion 26 of the bottom wall of the water container.

A rubber gasket 31 is placed against the under side of the recessed portion 26 when the Bakelite or other insulation material knob 32 is positioned by means of the screw threaded insert 33 carried by the Bakelite knob and arranged to engage the threaded stud 28.

A vertical central opening 34 is formed in the stud 28 having the conical valve seat 35 formed at a point spaced below the upper end of the stud, the opening being enlarged above said valve seat as indicated at 36.

A central water port 38 is formed in the Bakelite knob 32 communicating with the corresponding port 34 in the stud.

A plurality of radial grooves 37 are formed in the upper surface of the annular flange 29 of the stud for a purpose to be later described.

A conical valve 39 is adapted to seat upon the valve seat 35 and is provided with the depending lead pin 40 and with the upright valve stem 41 to the upper end of which is connected a solid ball knob 42.

The valve is arranged to be closed under normal temperatures in the manner shown in Figure 1, and for the purpose of opening the same a pair of bi-metal strips 43 is provided, these strips being connected together at their outer ends as by the rivet 44, and being provided with apertures 45 near their inner ends, through which the valve stem 41 is slidably mounted.

These bi-metal strips are arranged to flex in opposite directions under heat, in the manner shown in Fig. 3 so as to raise the valve 39 from the valve seat 35.

A lid 46 preferably formed of Bakelite or similar material is adapted to close the upper open end of the water container 22. An integral depending extension 47 is formed upon this lid terminating at its lower end in an inverted housing 48 for the upper carbon electrode 49 which may be of annular form having a central opening 50 through which the depending central boss 51, of the extension 47, is located.

The insulation extension 47 may be of the length shown in Figure 1 or may be varied in length to govern the timing of the boiling of the water, shortening of the extension lengthening the time necessary to bring the water to the boiling point while lengthening of the extension shortens the time.

The electrode 49 is held in the housing 48 by means of the stainless steel screws 52 having heads 53 at their lower ends countersunk in the electrode and nuts 54 at their upper ends located within the recess 55 in the lid.

A central screw 56 is also provided having a hollow internally threaded head 57 countersunk in the central boss 51 of the electrode and provided with a nut 58, the upper threaded end of the screw extending considerably above said nut and through the cover plate 59 and receiving the threaded Bakelite knob 60.

A Bakelite cup 61 contains the lower carbon electrode 62, a screw 63 being located through the lower electrode 62 and threaded into the hollow head 57, the head of said screw being imbedded in the Bakelite cup 61.

A lock nut 64 is countersunk in the top of the lower electrode 62 and holds the electrode 62 in the cup 61.

A Bakelite spacer 65 is located between the upper and lower electrodes. This spacer is interchangeable and may be replaced by spacers of varying thicknesses as may be required for controlling the heating of water from different localities.

An electric cord 66 is located through a suitable aperture 67 in the cover plate 59, one wire 68 thereof being connected to one of the screws 52 and then to the other screw 52 as by a jumper 69, while the other wire 70 of the cord is connected to the central screw 56. Thus, it will be seen that the wire 68 is connected to the upper electrode 49 and the wire 70 is connected to the lower electrode 62.

Ports 71 are formed through the upper electrode 49 and the Bakelite housing 48 for the release of the water and steam.

In the operation of the improved drip coffee maker the valve 39 is inserted in place in the bottom of the water container, being seated upon the valve seat 35 as shown in Figure 1.

Cold water is then poured into the water container up to the line C—C. The bi-metal strips 43 being cold, these strips are contracted together as shown in Figure 1 permitting the valve 39 to tightly fit, thus preventing the water from passing down through the port 34.

It should be understood, of course, that the proper amount of ground coffee has first been placed in the coffee basket and the spreader plate 20 placed in position thereon.

The lid 46 carrying the electrodes is then placed in position upon the top of the water container, inserting the electrodes into the water to the depth shown in Figure 1 and the cord 66 is plugged into a base receptacle or socket.

The water then completes the circuit between the electrodes 49 and 62 and the heating action of the water immediately starts.

By this heating action water is drawn in between the electrodes at the line B—B, being drawn or circulated in the direction of the arrows R and flowing up through the ports 71.

This action continues until the water above the line B—B reaches or closely approximates the boiling point, after which the heat starts to radiate downward from the line B—B and a flow of water to the electrodes is created as indicated by the arrows U.

This radiation and flow of water continues downward to the line D—D and then on down to the line E—E, both of which are shown in Figure 1, and finally when the boiling action reaches the bi-metal strips 43 these bi-metal strips expand to the position shown in Fig. 3 opening the valve 39 and permitting the hot water to flow down through the port 34 onto the spreader plate 20 where it is evenly distributed as it passes through the ground coffee in the coffee basket.

In Fig. 5 is shown a modification of the invention, in which the open electrodes are located in upright position and connected to the side of the glass water container 22a.

As the electrodes are thus not removed from the water container when the lid is removed, safety means such as shown in my Patent No. 2,152,122, dated March 28, 1938, may be provided upon the lid 46a for preventing the plug-in points 72 from being engaged by the connector plug 73 when the lid is open, the curved flange 74 of the lid being adapted to operate in the manner disclosed in said prior patent whereby the lid may not be opened while the electrodes are electrically connected and the electrodes may not be electrically connected while the lid is open.

The housing 48a in which the electrode 49a is mounted may be connected to the side wall of the container 22a by the screw 56a having the hollow threaded head 57a which receives the screw 63a, the head of which is embedded in the cup 61a carrying the other electrode 62a, a spacer of desired thickness being located between the electrodes as indicated at 65a.

One of the plug-in points 72 is connected by a wire 68a with one of the screws 52a, a jumper wire 69a connecting the screws 52a together. The other plug-in post is connected by a wire 70a to the central screw 56a.

The same construction of bi-metal operated valve is provided in the bottom of the container 22a, and the rest of the drip coffee maker may be constructed just the same as shown in Figure 1 and the operation will be substantially as above described.

As the container 22a is filled with cold water and plugged into an electric receptacle or socket, the water will be permitted to circulate upward between the spaced electrodes and the boiling action will take place substantially from the line H—H to the line G—G and will then radiate downward and cause the operation of the bimetal valve mechanism, opening the valve as above described.

A metal cover 75 may be provided over the wiring to the electrodes and a Bakelite knob 76 may be placed upon the end of the screw 56a for holding the metal cover in place.

In Fig. 7 is shown an electrode construction substantially the same as shown in Fig. 1 with the addition of a circulating tube 77 formed upon the lower Bakelite cup 61, ports 78 being located through the cup 61 and electrode 62.

With this circulating tube provided upon the lower Bakelite cup, the water will be circulated substantially as indicated by the arrows in Fig. 7.

By lengthening this extension tube the time for bringing the water to the boiling point is shortened and by providing a shorter extension tube the time for bringing the water to the boiling point would be accordingly lengthened.

In Fig. 6 is shown a modification of the invention in which the conventional electric heating element is substituted for the open electrode type of the other forms above described.

The insulation lid 46b has the depending tubular extension 79 provided with the spaced cavities 80 and 81.

The heating element of any ordinary type of wire element is located within the larger cavity 80 and as indicated at 82 may comprise a conventional wire element encased in a metal container, and in the other cavity 81 is located a pair of switch clips 83.

The electric cord 84 is located through an opening in the cover plate 85 which is retained upon the lid 46b to cover the wiring.

One wire 86 leads from the cord 84 to one switch clip 83 and the other wire 87 leads from the cord 84 to one side of the element 82, the other side of the element being connected to the other switch clip 83.

A hollow metal ball float 88 is located in the smaller cavity 81 and adapted to normally rest upon the stop pin 89 at the bottom of said cavity. When water is poured into the container and rises toward the top of the same the float ball 88 will be moved to the dotted line position closing the circuit through the switch clips 83 to the element 82.

As the element is heated the water begins to circulate, as indicated by the arrows, flowing out through the ports 90. The water reaches the boiling point between the lines K—K and J—J after which it radiates and circulates downward until it finally operates the valve in the manner above described.

In Fig. 8 is shown a slight modification of the form of the invention shown in Fig. 6, the cavity 81a in which the float ball 88a operates to close the circuit through the switch clips 83a is located in a vertical position while the cavity 80a in which the element 82a is located, is horizontally disposed.

Circulation of the water through the ports 90a permits the water to be heated as it circulates around the heating element.

In Figs. 9 and 10, the invention is shown applied to a teakettle which may be porcelain, glass or similar material, as indicated generally at 100 and provided with a lid 101. If desired, the heating elements such as shown in Figs. 1, 6 and 7 may be suspended from the lid in the manner above described.

As shown in Fig. 9, the open electrode type of heating means may be provided in upright position connected to one wall of the teakettle.

The lower or outer electrode 102 may be connected to the adjacent side wall of the teakettle body as by the machine screw studs 103, a fiber washer 104 and metal washer 105 being located around each stud beneath the nut 106, a stainless steel machine screw 107 being inserted through the electrode 102 and into each stud 103.

The machine screw stud 108 is located through the central insulating bushing 109 and through the adjacent wall of the teakettle, a fiber washer 104 and metal washer 105 being located around said stud beneath the nut 106.

A rubber gasket 110 may be provided between the electrode 102 and the adjacent wall of the teakettle.

The other electrode 111 may be mounted in the Bakelite cup 112 within which the threaded metal insert 113 is embedded, a lock nut 114 holding said metal insert in place.

An interchangeable Bakelite spacer 115 is located around the screw 113 to space the electrodes apart when said screw is received in the internally threaded socket of the stud 108.

A sheet metal case or housing 116 may cover the connection above described, and a handle 117 of any suitable material may be connected to the body of the teakettle as by a machine screw 118 located through the upper end of the handle or through a wood or Bakelite pedestal 119 and through the adjacent wall portion of the teakettle body and provided with the fiber washer 120 and nut 121.

The lower end of the handle 117 receives the reduced threaded end 122 of the stud 103 and a knob 123 of Bakelite or the like with threaded metal insert may be received upon the reduced screw 122.

Thermal points 124 of usual construction may be connected to and insulated from the housing 116 and electrically connected to the electrodes by means of the wire 125 leading from one thermal point to the central stud 108 and the wire 126 leading from the other thermal point to one of the studs 103, a jumper wire 127 connecting the studs 103.

The operation of the teakettle will be apparent from the above description regarding the drip coffee makers.

It has been found by experience that the electrodes when set at an angle as shown in Fig. 9 permits a greater activity of the current than when set in a horizontal position in the bottom of the kettle.

For instance, it has been found that with a certain size spacer in the bottom of the kettle would pull 1200 watts, while setting on an angle as shown in Fig. 9, and using the same size spacer it would pull 2000 watts.

The reason for this is that when boiling in the core of a vacuum of water there is a thin film of steam forms on the bottom surface of the upper electrode which does not permit the water to readily contact the upper electrode, while when the electrodes are set at an angle as shown in Fig. 9, the steam moves upward rapidly between the electrodes followed by the lower temperature water circulating therethrough, permitting ready contact and a faster boiling activity.

I claim:

1. An automatic electric utensil including a water container having a removable lid, an electric heating unit within the water container comprising a disc shape electrode suspended from the lid of the container, a second disc shape electrode supported upon and spaced from the first electrode, means insulating the electrodes from each other and a normally open electric circuit in which the electrodes are located, so that the placing of water in the container automatically closes the circuit when the water reaches a level bridging the space between the electrodes, an outlet valve in the water container, and means operated by the heating of the water in the container for opening said valve.

2. An automatic electric utensil including a water container having a removable lid, an electric heating unit within the water container comprising a horizontally disposed disc shape electrode suspended from the lid of the container, a second horizontally disposed disc shape electrode supported upon and spaced below the first electrode, means insulating the electrodes from each other and a normally open electric circuit in which the electrodes are located, so that the placing of water in the container automatically closes the circuit when the water reaches a level bridging the space between the electrodes, an outlet valve in the water container, and means operated by the heating of the water for opening the valve.

3. An automatic electric utensil including a water container, an electric heating element within the water container, an open electric circuit connected to said heating element, a pair of spaced switch clips in said circuit, a hollow metal ball arranged to contact with both switch clips to close said circuit, and means for guiding the ball to and from said switch clips so that the circuit will be closed when a predetermined amount of water is placed in the container, an outlet valve in the water container and means operated by the heating of water in the container for opening the valve.

4. An automatic electric utensil including a water container, an electric heating element within the water container, an open electric circuit connected to said heating element, a pair of spaced switch clips in said circuit, said clips being located at a point spaced above the bottom of said heating element, a hollow metal ball arranged to contact with both of said switch clips to close said circuit, means for guiding the ball to and from said switch clips so that the circuit will be closed when water in the container reaches a predetermined level above the bottom of said heating element, an outlet valve in the container, and means operated by the heating of the water in the container for opening said valve.

5. An automatic electric utensil including a water container, a housing in the container, the housing having ports to permit circulation of water therethrough, an electric heating element within the housing, an open electric circuit connected to said heating means, a pair of spaced switch clips in said circuit, an upright cavity in the housing open at its lower end, said switch clips being located in said cavity at a point spaced above the bottom of the heating element, a hollow metal ball located in said upright cavity and arranged to contact with both of said switch clips to close said circuit when a predetermined amount of water is placed in said water container, an outlet valve in the water container and means operated by the heating of water in the container for opening said valve.

6. An automatic electric utensil including a water container, a housing in the container open at its lower end, the housing having ports to permit circulation of water therethrough, an electric heating element within the housing, an open electric circuit connected to said heating means, a pair of spaced switch clips in said circuit, an upright cavity in the housing open at its lower end, said switch clips being located in said cavity at a point spaced above the bottom of the heating element, a hollow metal ball located in said upright cavity and arranged to contact with both of said switch clips to close said circuit when a predetermined amount of water is placed in said water container, an outlet valve in the water container and means operated by the heating of water in the container for opening said valve.

ALBERT C. WILCOX.